United States Patent
Cavaliere et al.

(10) Patent No.: US 9,813,185 B2
(45) Date of Patent: Nov. 7, 2017

(54) WDM SINGLE FIBER RING PROTECTION

(71) Applicant: Telefonaktiebolaget L M Ericsson (publ), Stockholm (SE)

(72) Inventors: Fabio Cavaliere, Pisa (IT); Alberto Bianchi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/903,676

(22) PCT Filed: Jul. 10, 2013

(86) PCT No.: PCT/EP2013/064594
§ 371 (c)(1),
(2) Date: Jan. 8, 2016

(87) PCT Pub. No.: WO2015/003746
PCT Pub. Date: Jan. 15, 2015

(65) Prior Publication Data
US 2016/0173225 A1    Jun. 16, 2016

(51) Int. Cl.
*H04J 14/00* (2006.01)
*H04J 14/02* (2006.01)
(Continued)

(52) U.S. Cl.
CPC ........ *H04J 14/0287* (2013.01); *H04B 10/032* (2013.01); *H04Q 11/0062* (2013.01);
(Continued)

(58) Field of Classification Search
CPC ............. H04J 14/0283; H04J 14/0287; H04J 14/0295; H04J 14/0241; H04J 14/0291;
(Continued)

(56) References Cited

U.S. PATENT DOCUMENTS 6,331,905 B1 * 12/2001 Ellinas ................ H04J 14/0227
398/17
6,895,182 B1 *  5/2005 Moriyama ............ H04J 3/085
370/222
(Continued)

FOREIGN PATENT DOCUMENTS

EP    0 977 394 A2    2/2000
EP    2 493 096 A1    8/2012

OTHER PUBLICATIONS

JDSU White Paper; A Performance Comparison of WSS Switch Engine Technologies, May 2009.
(Continued)

*Primary Examiner* — Hibret Woldekidan
(74) *Attorney, Agent, or Firm* — Baker Botts, LLP

(57) ABSTRACT

A node (20, 25) for a single fiber bidirectional WDM optical ring network has a first optical protection switch (100) having first and second ports for coupling to the single fiber bidirectional ring, while providing a pass through optical path for wavelengths on the bidirectional ring. A further port is coupled to an external optical path. In operation the switch couples optically bidirectional selected wavelengths between the external optical path and either of the first and second ports selectively, according to an indication of a fault on the ring, so as to use different portions of the bidirectional ring respectively as working path and protection path. This combines coupling wavelengths with the ring, with the selection of protection or working path, which simplifies the optical equipment, and upstream and downstream optical delays can be symmetrical.

14 Claims, 17 Drawing Sheets

(51) Int. Cl.
*H04B 10/032* (2013.01)
*H04Q 11/00* (2006.01)

(52) U.S. Cl.
CPC ............ *H04Q 2011/0081* (2013.01); *H04Q 2011/0092* (2013.01)

(58) Field of Classification Search
CPC ............ H04J 14/0294; H04J 14/0212; H04J 14/0206; H04J 14/022; H04J 14/0201; H04J 2203/006; H04J 3/14; H04J 3/085; H04B 10/032; H04B 10/275; H04B 10/03; H04B 10/2755; H04B 10/035; H04B 10/0771; H04B 10/0791; H04Q 11/0062
USPC .......................................................... 398/1–5
See application file for complete search history.

(56) References Cited

U.S. PATENT DOCUMENTS

| | | | | |
|---|---|---|---|---|
| 7,313,296 | B2* | 12/2007 | Fang | H04J 14/0241 385/16 |
| 7,433,593 | B1* | 10/2008 | Gullicksen | H04B 10/032 398/3 |
| 9,264,254 | B2* | 2/2016 | Holness | H04L 49/00 |
| 9,467,332 | B2* | 10/2016 | O'Connor | H04L 41/0663 |
| 9,531,584 | B2* | 12/2016 | Magill | H04J 3/085 |
| 2007/0264009 | A1* | 11/2007 | Sabat, Jr. | H04B 10/1127 398/5 |
| 2009/0257751 | A1* | 10/2009 | Sadananda | H04J 14/0227 398/83 |
| 2010/0189442 | A1* | 7/2010 | Grobe | H04J 3/085 398/79 |
| 2012/0275779 | A1* | 11/2012 | Zhang | H04J 14/0295 398/3 |
| 2014/0193146 | A1* | 7/2014 | Lanzone | H04J 3/14 398/2 |
| 2014/0363152 | A1* | 12/2014 | Hironaka | H04Q 11/0005 398/5 |

OTHER PUBLICATIONS

A Single-Fiber Self-Healing CWDM Metro Access Ring Network for Broadcast and Dedicated Broadband Services by Zhaoxin Wang et al., 2006.

International Search Report for International application No. PCT/EP2013/064594, dated Jan. 7, 2014.

* cited by examiner

WDM SINGLE FIBER RING PROTECTION

PRIORITY

This nonprovisional application is a U.S. National Stage Filing under 35 U.S.C. §371 of International Patent Application Serial No. PCT/EP2013/064594, filed Jul. 10, 2013, and entitled "WDM Single Fiber Ring Protection".

TECHNICAL FIELD

The present invention relates to nodes for single fiber bidirectional rings, to communication networks having such rings, to methods of protection switching, and to methods of configuring wavelength selection at a node.

BACKGROUND

It is known to provide WDM optical communications networks in the form of rings or interconnected rings. Typically these are bidirectional rings using two or four fibers. Various automatic protection switching schemes are known. For example, in a BLSR protection scheme, in the event of a fault, wavelengths travelling in one direction around the ring are switched to another fiber to enable them to reverse direction around the ring to reach their destination node.

It is known to use WDM optical networks for use in mobile backhaul networks. Current solutions for mobile backhaul networks may use L2/L3 switching with OEO (Optical-Electrical-Optical) conversion or microwave radio connections. The introduction of differentiated broadband services requiring low latency, the increase of the traffic load, the convergence of the mobile and fixed infrastructures, the need for sites consolidation and energy saving are all motivating the introduction of optical solutions in radio access and backhaul networks. This means packet processing is moved to the access and metro edge of the network and intermediate channel add-drop and ring interconnection is performed at the physical layer in the optical domain. Optical connections can help in saving energy, e.g. replacing switches for ring interconnection with ROADM based nodes or avoiding bridge sites. This is particularly so where protection is provided, in H-RAN parts for example. This implies equipment duplication.

SUMMARY

Embodiments of the invention provide improved methods and apparatus. According to a first aspect of the invention, there is provided a node for a single fiber bidirectional WDM optical ring network, the node having: a first optical protection switch having first and second ports for coupling to respective first and second adjacent portions of the single fiber bidirectional ring, while providing a pass through optical path for wavelengths on the bidirectional ring to pass between the first and second adjacent portions. The first optical protection switch also has a further port for coupling to an external optical path, external to the bidirectional ring, the first optical protection switch also having a control input for receiving an indication of a fault in the bidirectional ring. The optical protection switch is also operable to couple optically bidirectional selected wavelengths between the external optical path and either of the first and second ports selectively, according to the indication of a fault, so as to use the first and second adjacent portions of the bidirectional ring respectively as a working path and a protection path for the bidirectional selected wavelengths, and so as to maintain the same optical path on the bidirectional ring for both directions of the bidirectional selected wavelengths.

A benefit of combining the functions of coupling wavelengths in or out of the ring, as well as selecting between protection and working paths, is that less or simpler optical equipment is needed. By using a single fiber bidirectional ring rather than different fibers for the different directions around the ring, the switching can be implemented with fewer ports, and again less or simpler optical equipment is needed. Thus costs can be reduced. See FIGS. 1 and 2 for example. Notably by having upstream and downstream selected wavelengths have the same optical path on the ring, the optical delays are symmetrical even when the protection path is used. This is useful for applications which are sensitive to any asymmetry, such as CPRI.

Embodiments can have any additional features added to these features, and some such additional features are described and set out in dependent claims. Any such additional features may be disclaimed from any aspect. One such additional feature is the optical protection switch being configured to maintain the pass through optical path when coupling the bidirectional selected wavelengths between the external optical path and the second port. This can help enable the protection switching of the selected wavelengths to remain independent of any protection scheme for the other wavelengths on the ring. See FIGS. 1 and 2 for example.

Another such additional feature is the first optical protection switch comprising a 2×2 optical switch and a wavelength selective switch, the wavelength selective switch having a common port and at least two switched ports, the common port and one of the switched ports being coupled separately to a first side of the 2×2 optical switch, another side of the 2×2 optical switch being coupled separately to the first and second ports respectively, and another of the switched ports of the wavelength selective switch being coupled to the external optical path, the 2×2 optical switch having a working path state in which it is operable to couple the common port to the first port and to couple the one of the switched ports to the second port, and a protection path state in which it is operable to couple the common port to the second port and to couple the one of the switched ports to the first port. This is a particularly efficient arrangement using relatively simple low cost equipment, to help reduce costs. See FIG. 3 for example.

Another such additional feature is a second optical protection switch to couple the external optical path to a second single fiber bidirectional ring, the second optical switch comprising third and fourth ports for coupling with first and second adjacent portions of the second single fiber bidirectional ring. This second optical protection switch is operable to couple optically the bidirectional selected wavelengths selectively with either of the third and fourth ports, according to an indication of a fault in the second bidirectional ring, so as to use the first and second adjacent portions of the second bidirectional ring respectively as a working path and a protection path for the bidirectional selected wavelengths, and so as to maintain the same optical path on the second bidirectional ring for both directions of the bidirectional selected wavelengths. This use of the node as an interconnecter between rings as well as a protection switch can also reduce the amount of equipment and thus help to reduce costs. See FIGS. 4 and 5 for example.

Another such additional feature is an optical monitor configured to monitor the bidirectional ring to detect a fault condition and to generate the fault indication. By detecting the fault locally, response can be more rapid, and involve less equipment. See FIGS. 5, 7 and 8 for example.

Another such additional feature is an automatic protection controller configured to receive an indication of a fault in the bidirectional ring and being operable to control the first optical protection switch to use the working path or the protection path according to the indication of a fault. This can enable the fault indication to be processed, or can enable the protection switching to be timed or coordinated with other events for example.

Another such additional feature is the first optical protection switch having a second further port for coupling a subset of the bidirectional selected wavelengths with a second external optical path. A benefit of this is that a further add/drop capability can be added with less additional complexity than adding a conventional separate add/drop node. See FIG. 15 for example.

Another aspect provides a communications network having a single fiber bidirectional ring and having at least two nodes, the nodes each having a first optical protection switch having first and second ports for coupling to respective first and second adjacent portions of the single fiber bidirectional ring, while providing a pass through optical path for wavelengths on the bidirectional ring to pass between the first and second adjacent portions, the first optical protection switch also having a further port for coupling to an external optical path, external to the bidirectional ring. The first optical protection switch has a control input for receiving an indication of fault in the bidirectional ring, and the optical protection switch is operable to couple optically the bidirectional at least one selected wavelengths between the external optical path and either of the first and second ports selectively, according to the indication of a fault, so as to use the first and second adjacent portions of the bidirectional ring respectively as a working path and a protection path for the bidirectional selected wavelengths, and so as to maintain the same optical path on the bidirectional ring for both directions of the bidirectional selected wavelengths. A benefit of a pair of nodes is that the working path or protection path can be completed with simpler equipment at both ends. If either end detects a fault, they can both switch. See FIG. 1 or 4 for example.

Another such additional feature is the pair of nodes for the network being as set out above. Another such additional feature of the communications network is a second single fiber bidirectional ring, interconnected by a node as set out above. This interconnecter between rings as well as a protection switch can also reduce the amount of equipment and thus help to reduce costs. See FIG. 4 or 5 for example.

Another such additional feature is a second interconnecting node to provide a redundant interconnection between the two single fiber bidirectional rings. This can help avoid a possible single point of failure at the interconnecting node. See FIG. 16 for example.

Another aspect provides a method of protection switching at a node of a single fiber bidirectional WDM optical ring network, the node having a first optical protection switch having first and second ports for coupling to respective first and second adjacent portions of the single fiber bidirectional ring, while providing a pass through optical path for wavelengths on the bidirectional ring to pass between the first and second adjacent portions, the first optical protection switch also having a further port for coupling to an external optical path, external to the bidirectional ring. The method has the steps of: when no fault is indicated, sending communications traffic using bidirectional selected wavelengths via the first optical protection switch, configured to couple optically the bidirectional selected wavelengths between the further port and the first port, to use the first adjacent portion of the bidirectional ring as a working path for the bidirectional selected wavelengths. When an indication of a fault in the bidirectional ring is received, there is a step of sending communications traffic using the bidirectional selected wavelengths via the first optical protection switch between the further port and the second port, to use the second adjacent portion of the bidirectional ring as a protection path for the bidirectional selected wavelengths so as to maintain the same optical path on the bidirectional ring for both directions of the bidirectional selected wavelengths. See FIGS. 1, 12 and 14 for example.

Another such additional feature is the node further comprising a second optical protection switch, coupled to the external optical path, and coupled to a second single fiber bidirectional ring, the second optical switch comprising third and fourth ports for coupling with adjacent portions of the second single fiber bidirectional ring, and the method also having the steps of: when no fault is indicated in the second bidirectional ring, sending communications traffic using the bidirectional selected wavelengths via the second bidirectional ring and via the second optical protection switch, configured to couple optically the selected at least one wavelength between the external optical path and the third port, to use a first adjacent portion of the bidirectional ring as a working path for the bidirectional selected wavelengths, and when an indication of a fault in the second bidirectional ring is received, sending the communications traffic using the bidirectional selected at least one wavelength via the second optical protection switch, configured to couple optically the selected at least one wavelength between the external optical path and the fourth port, to use a second adjacent portion of the second bidirectional ring as a protection path for the selected at least one wavelength so as to maintain the same optical path on the bidirectional ring for both directions of the bidirectional selected wavelengths.

Another such additional feature is the at least one selected wavelengths comprising bidirectional wavelengths, the first optical protection switch being configured to use the same optical path for both directions of the bidirectional wavelengths, and the communications traffic comprising upstream and downstream CPRI frames. This can enable upstream and downstream wavelengths to maintain the same optical delays even when switched onto the protection path, so that CPRI frames are not affected by any asymmetry. See FIG. 17 for example.

Another aspect provides a method of configuring wavelength selection at a node of a single fiber bidirectional WDM optical ring network, the node having a first optical protection switch having first and second ports for coupling to respective first and second adjacent portions of a single fiber bidirectional ring, while providing a pass through optical path for wavelengths on the bidirectional ring to pass between the first and second adjacent portions, the first optical protection switch also having a further port for coupling to an external optical path, external to the bidirectional ring, the method having the step of: when a request to set up bidirectional selected wavelengths is received, configuring the optical protection switch to couple optically the bidirectional selected wavelengths between the further port and the first port, to use the first adjacent portion of the bidirectional ring as a working path for the bidirectional selected wavelengths. The method also having the steps of reserving the same bidirectional selected wavelengths in the second adjacent portion of the bidirectional ring as a protection path, and sending communications traffic using the bidirectional selected wavelengths via the first optical protection switch so as to maintain the same optical path on the bidirectional ring for both directions of the bidirectional selected wavelengths. This corresponds to FIGS. 9 and 10 for example before such configuring, and FIGS. 11 and 12 after such configuring.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
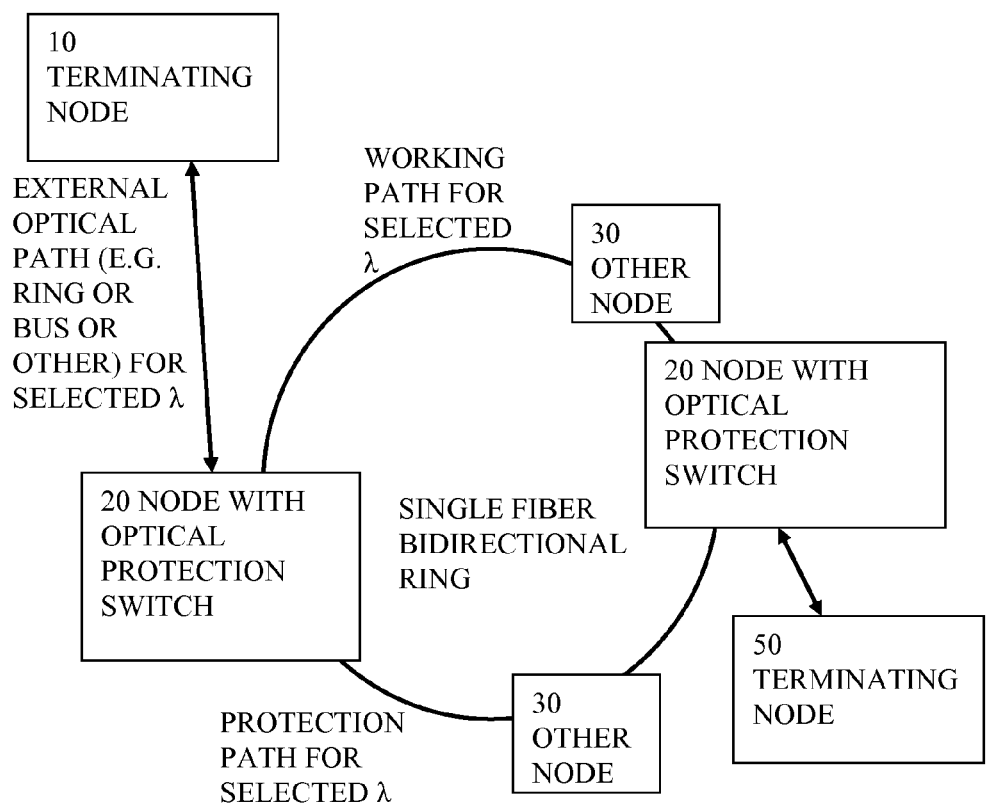
FIG. 1 shows a schematic view of a ring with nodes having an optical protection switch according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. It will be appreciated by those skilled in the art that block diagrams can represent conceptual views of illustrative circuitry embodying the functionality. Similarly, it will be appreciated that any flow charts, state transition diagrams, pseudocode, and the like represent various processes which may be substantially represented in computer readable medium and so executed by a computer or processor, whether or not such computer or processor is explicitly shown.

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described radio base stations, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

ABBREVIATIONS

AWG Arrayed Wave Guide
BSC Base Station Controller
CPRI Common Public Radio Interface
DL Downlink
DLP Digital Light Processing DS Downstream
DWDM Dense WDM
FDD Frequency division Duplexing
GPON Gigabit PON
L2/L3 OSI Layer 2/layer 3
MU Main Unit
MZM Mach Zehnder Modulator
OBSAI Open Base Station Architecture Initiative
OLT Optical Line Terminal
ONT Optical Network Terminal
P2P Point To Point
PON Passive Optical Network
RBS Radio base Station
RE Radio Equipment
REC Radio Equipment Controller
RF Radio Frequency
RNC Radio Network Controller
ROADM Reconfigurable Optical Add Drop Multiplexer/demultiplexer
RRU Remote Radio Unit
SMF Single Mode Fiber
UE User equipment
UL Uplink
US Upstream
WCDMA wideband code division multiple access
WDM Wavelength Division Multiplexing
3GPP Third Generation partnership project

INTRODUCTION

By way of introduction to the embodiments, how they address some issues with conventional designs will be explained.

In many radio access networks the radio base station is located concentrated at a single site. However, a radio base station can also have a distributed architecture. For example, a distributed radio base station (RBS) can take the form of one or more radio equipment (RE) portions that are linked to a radio equipment control (REC) portion over a radio base station internal interface.

Such distributed radio base stations can have a processing Main Unit (MU) at the REC, and at the RE a set of antennas with dedicated RF equipment able to cover multiple radio cells (RRUs), where a single MU is shared among multiple RRUs. This new architectural approach in the RBS implementation requires high capacity, cost effective and low latency transport systems between MU (processing) and RRUs (antennas).

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 5.0 (2011). Other interfaces can be used, for example the Open Base Station Architecture Initiative (OBSAI) but such alternatives have not yet proved as popular.

This approach of providing "remotization" of the RF part of the RBS from the main unit can bring advantages such as rationalization of RBS processing unit, with benefits in terms of cost and power consumption, dynamic allocation of RF and/or processing resources depending on cell load and traffic profiles, and correlation of data supported by all the antennas which are afferent on the same processing unit. It increases radio link reliability, bandwidth, and coverage and optimizes the power consumption. This can enable some "cloud computing" concepts to be applied to the radio access networks.

Point to point (P2P) optical links can be used for the interface between the baseband controller and radio head or heads. For this interface, WDM systems, can enable guaranteed low latency, protocol transparency, high bandwidth and an increased spectral efficiency. The costs, over a 2-5 year time scale projection, can be comparable with conventional optical access technologies, such as P2P and GPON. Nowadays they are realized through a standard protocol named CPRI, transmitted over P2P dedicated optical links. Notably CPRI has pressing constraints in terms of latency (round-trip delay) and in particular in terms of uplink/downlink synchronization.

The CPRI standard recites optical fibers for transmission link up to 10 km, recites determining a round trip delay, and specifies synchronisation and timing accuracies, e.g. link round trip delay accuracy of 16 nsecs.

Embodiments can provide a low cost optical node for a single fiber bidirectional WDM ring, or for interconnecting two rings in the radio access network (RAN). For example one ring can be in the low RAN (L-RAN) and a second ring in the high RAN (H-RAN). Compared to current solutions in the electrical domain, optical technology can ensure transparent service transport, minimal latency and high spectral efficiency. On the other hand, the cost of optical devices (e.g. ROADM) could be too high for a radio access network, so solutions cheaper than current WDM metro networks are desirable. Furthermore solutions should be able to minimize relative delay and synchronization issues between upstream and downstream directions.

Widespread in metro networks, DWDM technology can offer advantages in term of bandwidth capabilities and scalability also in mobile backhaul and radio access networks, especially considering broadband services and bandwidth request are increasing over time, in particular peak rate and cell load. WDM permits ultra-broad dedicated bandwidth and very low latency for each or a cluster of radio base stations. LRAN and HRAN networks are typically implemented with L2/3 switches. Upgrading to use optical connections can help in saving energy, e.g. replacing switches for ring interconnection with ROADM based nodes or avoiding bridge sites. This is even more true considering ring protection in the HRAN that would normally require equipment duplication.

Current solutions for mobile backhaul networks use L2/L3 switching with OEO (Optical-Electrical-Optical) conversion or microwave radio connections. The introduction of differentiated broadband services requiring low latency, the increase of the traffic load, the convergence of the mobile and fixed infrastructures, the need for sites consolidation and energy saving are all reasons for the introduction of optical solutions in radio access and backhaul networks, where packet processing is moved to the access and metro edge of the network and intermediate channel add-drop and ring interconnection is performed at the physical layer in the optical domain.

Figure 2:
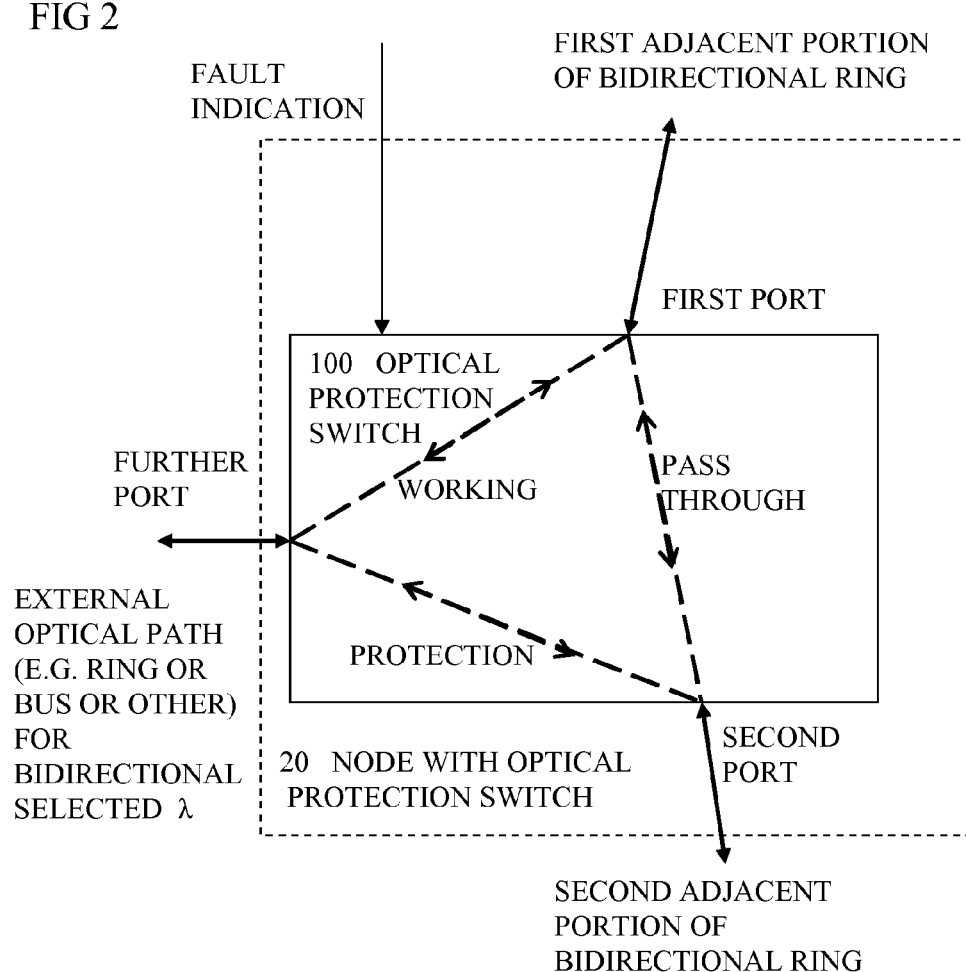
FIG. 2 shows a schematic view of a node having an optical protection switch according to an embodiment.

Introduction to Features of Embodiments, FIGS. 1, 2

In order to minimize any asymmetry between the upstream and downstream directions (a key requirement in RAN), bidirectional propagation is considered over a single fibre. Cost saving is another reason for using bidirectional schemes, since no duplicated equipment is necessary for the two directions. In contrast, conventional ROADMs that deal with two fibres unidirectional links cannot manage the link protection in the bidirectional case. Such conventional ROADMs can add selected wavelengths in either direction of a WDM dual fiber ring.

In the embodiments described below, US/DS symmetry can be provided which can be crucial for CPRI links for example. Resiliency can be obtained with low latency compared to electrical switches, and at lower cost, suitable for RAN and Mobile Backhaul applications for example. In some embodiments a simple solution can offer the possibility to interconnect rings in a RAN in a cost efficient and transparent way.

FIG. 1 shows a schematic view of a network according to an embodiment. A single fiber bidirectional ring is coupled between nodes 20 which have an optical protection switch, and other nodes 30. An external optical path is coupled to the ring by the node 20. The external optical path can be exemplified for example by another ring or a bus or other arrangement. Selected wavelengths can be used to communicate data traffic from a terminating node 10 via the external optical path and via the single fiber bidirectional ring to another terminating node.

FIG. 2 shows a schematic view of an example of a node 20 with optical protection switch, for use in the embodiment of FIG. 1. It shows an optical protection switch 100 which has first and second ports for coupling the node into the ring. First and second adjacent portions of the ring are coupled to the respective first and second ports of the optical protection switch, which provides a bidirectional pass through optical path between the first and second ports. The optical protection switch also has a further port coupled to the external optical path. The optical protection switch also provides a working optical path between the further port and the first port, and a protection path between the further port and the second port. The protection path and working path are both bidirectional. The optical protection switch has an input for a fault indication, and the optical protection switch is arranged to couple either the working path or the protection path to the external optical path according to the fault indication. Thus the selected wavelengths can use one part of the ring as a working path, and can use the rest of the ring as a protection path.

Figure 3:
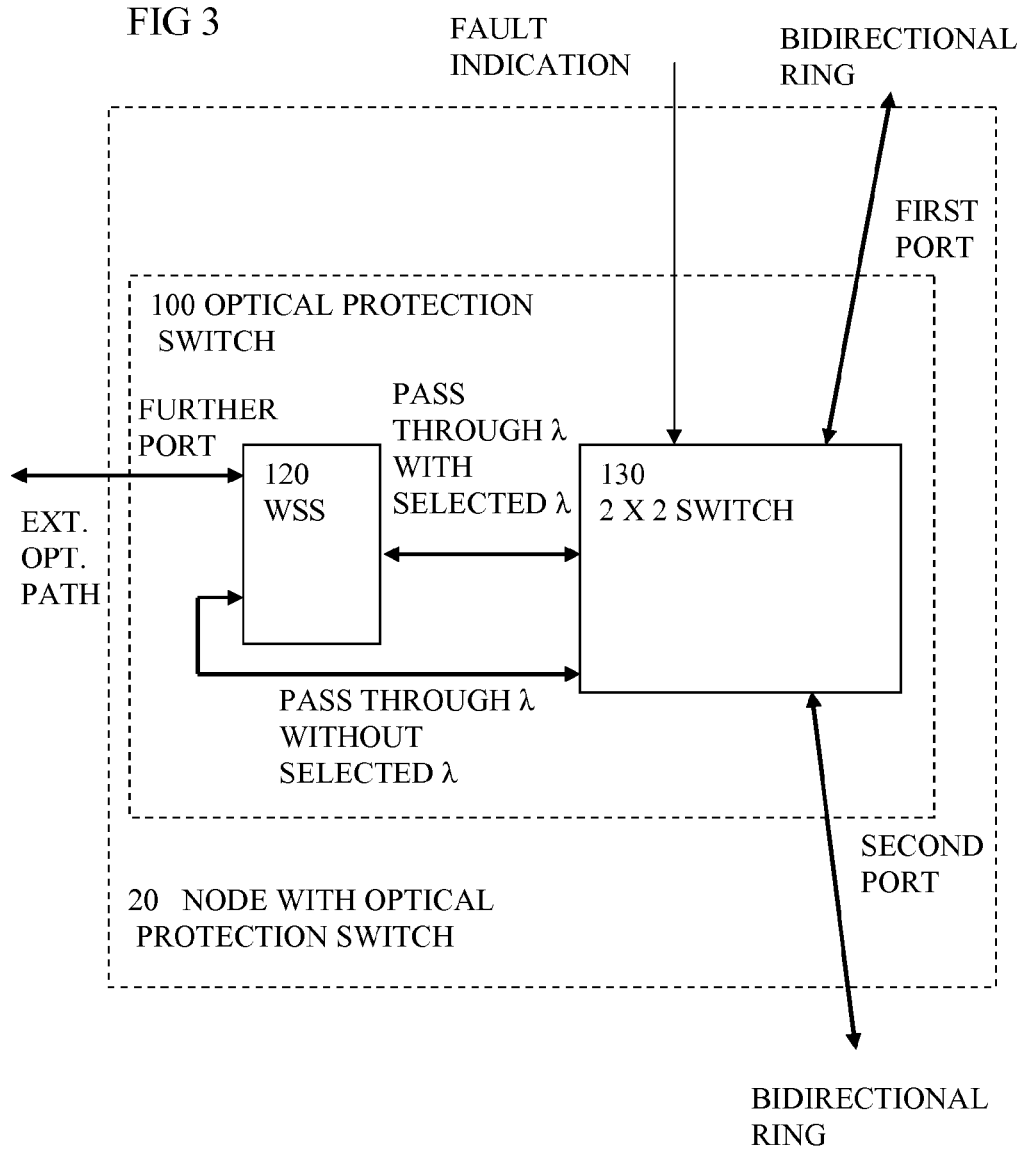
FIG. 3 shows a schematic view of a node having an optical protection switch according to an embodiment having a WSS and 2×2 optical switch.

FIG. 3, Node Having WSS and a 2×2 Optical Switch

FIG. 3 shows a schematic view of one possible implementation of the optical protection switch. In this case there is a WSS 120 and a 2×2 optical switch 130. The 2×2 switch operates to select whether the external optical path is coupled to the first port or the second port, and thus chooses the working path or the protection path, dependent on the fault indication. The optical pass through path is configured to pass between two ports of the 2×2 switch via the WSS. Thus the WSS effectively acts as a bidirectional wavelength mux/demux to couple selected wavelengths with the other wavelengths passing around the ring.

Figure 4:
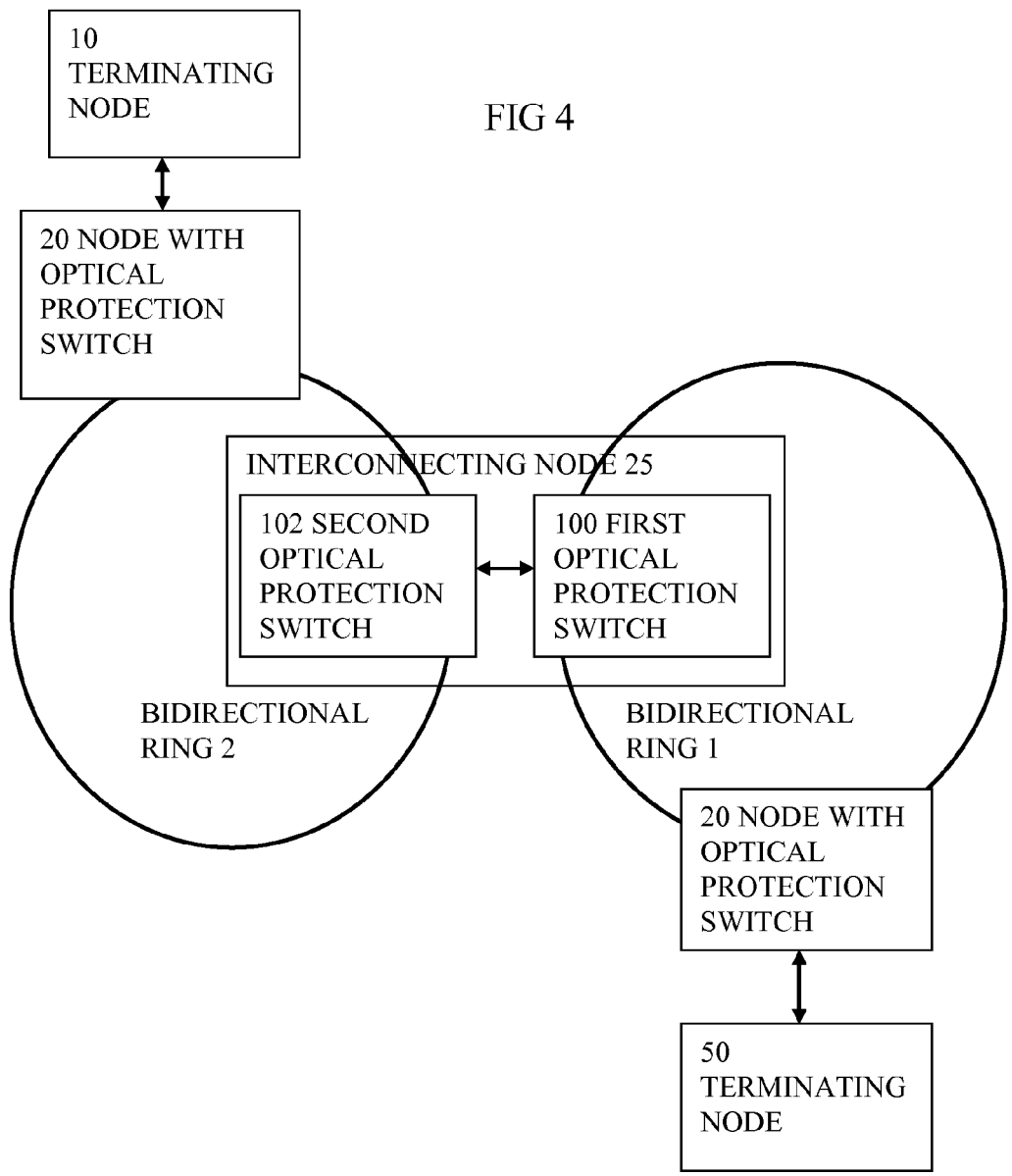
FIG. 4 shows a schematic view of two rings with an interconnecting node having optical protection switches according to an embodiment.

FIG. 4 Two Rings with an Interconnecting Node Having Optical Protection Switches FIG. 4 shows a schematic view of another embodiment having first and second bidirectional rings coupled by an interconnecting node 25 having first and second optical protection switches, 100, 102. Each of these optical protection switches can be similar to those shown in FIG. 2, and can be coupled together via the external optical path. In this case the selected wavelengths can be coupled from a terminating node 10 to a node 20 on the second ring, then via the interconnecting node to the first ring. The interconnecting node has a first optical protection switch 100 for coupling the wavelengths into the first ring. The first ring also has a node 20 with an optical protection switch for coupling the selected wavelengths from the first ring to a destination terminating node 50.

Protection and working paths can be provided by using different portions of the second ring, switched by the optical protection switches. The first of the rings can also be used to provide such protection and working paths by selecting which portion of the ring is used. The first of the rings has a node 20 with an optical protection switch, coupled to another terminating node 50.

This invention proposes a WDM node, having four or more ports, able to interconnect two fibre rings and ensuring link protection in case of fibre cut on one or both the rings. The node is subject to the following requirements: Bidirectional propagation is assumed in fibre and through the node. For each wavelength and in each ring, the working and protection paths are complementary paths of the ring. For both working and protected wavelengths, upstream and downstream signals travel, into opposite direction, along the same portion of the ring. Working downstream wavelengths travel counterclockwise (or vice versa) in both the interconnected rings while protected downstream wavelengths travel clockwise (or vice versa) in both the interconnected rings. And the directions apply vice versa for upstream wavelengths.

Figure 5:
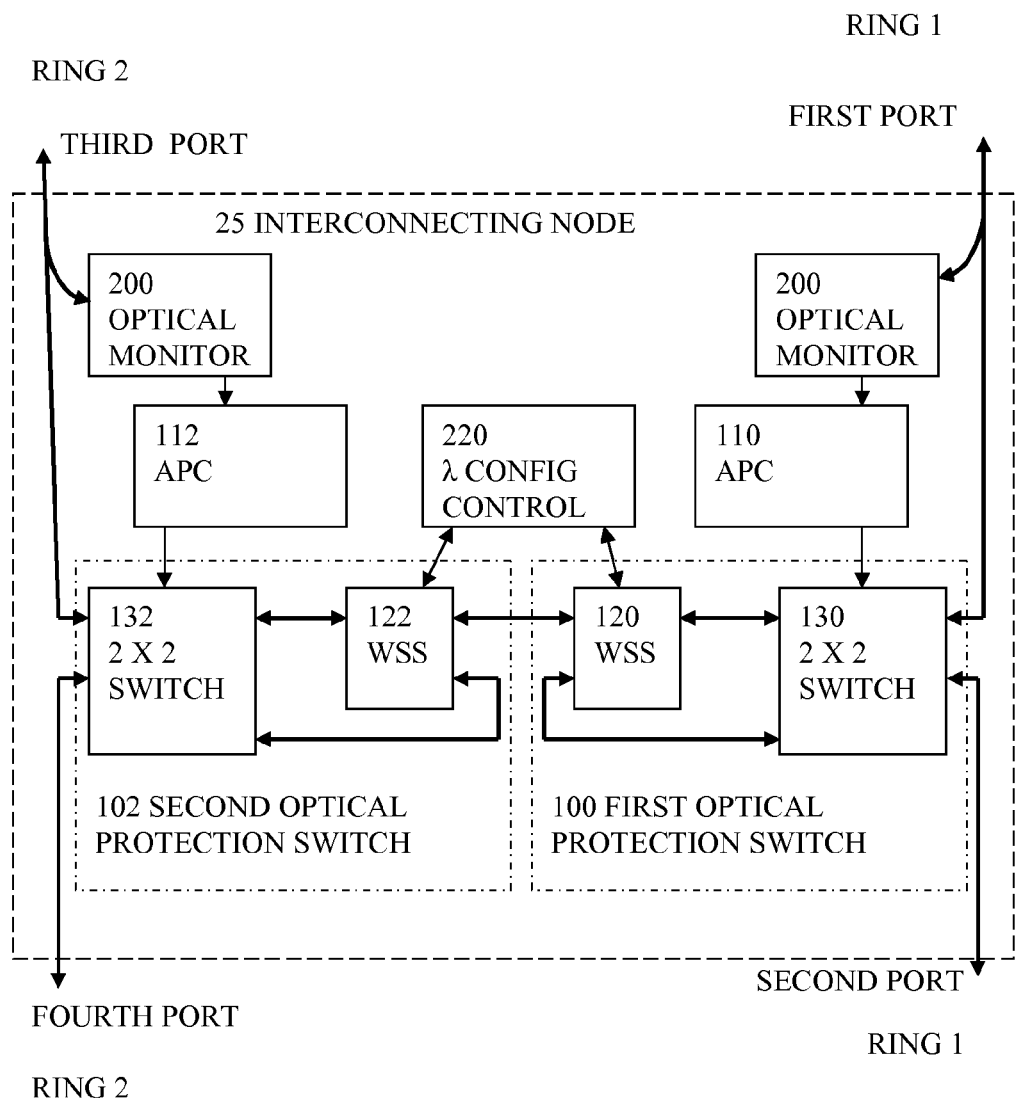
FIG. 5 shows a schematic view of an interconnecting node having optical protection switches according to an embodiment.

FIG. 5 Interconnecting Node Having Optical Protection Switches

FIG. 5 shows an example of an interconnecting node 25 for use in the embodiment of FIG. 4 or in other embodiments. It has a first optical protection switch 100 coupled to a second optical protection switch 102. Each of these parts can be implemented as shown in FIG. 2 or 3 for example. The second optical protection switch 102 has a 2×2 switch 132 and a WSS 122. The 2×2 switch has a third port and a fourth port for coupling to the second ring. The 2×2 switch 132 is controlled by an automatic protection controller APC 112. The APC is configured to generate an indication of a fault based on an optical measurement taken by an optical monitor 200 coupled to an optical tap on the second ring. A corresponding optical monitor is provided coupled to an optical tap on the first ring. This feeds an APC 110 coupled to control the 2×2 switch 130. A configuration and control part 220 is provided coupled to the WSS parts 120, 122 of both of the optical protection switches in order to control which wavelengths are added in and dropped out of the respective rings.

Figure 6:
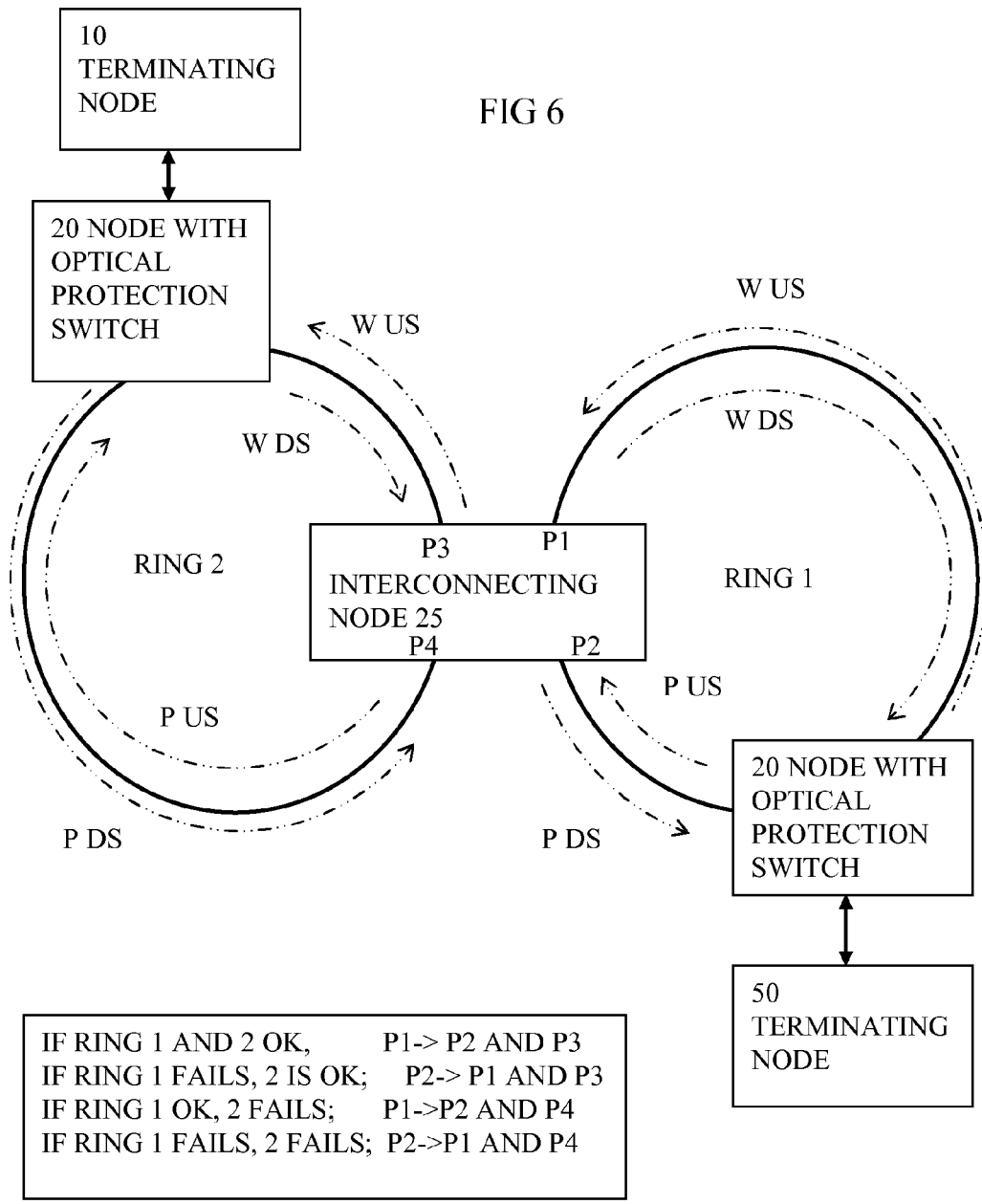
FIG. 6 shows a schematic view of two rings with an interconnecting node and showing working and protection paths according to an embodiment.

FIG. 6 Two Rings with Working and Protection Paths According to an Embodiment,

FIG. 6 shows a schematic view of an embodiment similar to that of FIG. 4, and showing working and protection paths on the first and second rings. WDS denotes a working downstream path on a longer segment of ring 1. WUS shows a working upstream path on the longer segment of ring 1. A shorter segment of ring 1 has a protection upstream path PUS and a protection downstream path PDS. A longer segment of ring 2 has a protection upstream path PUS and a protection downstream path PDS. A shorter segment of ring 2 has a working upstream path WUS and a working downstream path WDS.

As indicated, the connectivity of the interconnecting node is controllable to select protection or working paths on rings 1 and 2 as follows. If ring 1 and 2 are both OK, then port P1 is coupled to ports P2 (for pass though) and P3 (for selected wavelengths on the external path). If there is a fault indicated on ring 2 but ring 1 is OK, then port P2 is coupled to ports P1 (for pass through) and P3 (for the selected wavelengths)

If there is a fault indicated on ring 1 but ring 2 is OK, then port P1 is coupled to ports P2 (for pass through) and P4 (for the selected wavelengths to use the protection path on ring 2). If there is a fault indicated on ring 1 and ring 2, then port P2 is coupled to ports P1 (for pass through) and P4 (for the selected wavelengths to use the protection path on ring 2).

Figure 7:
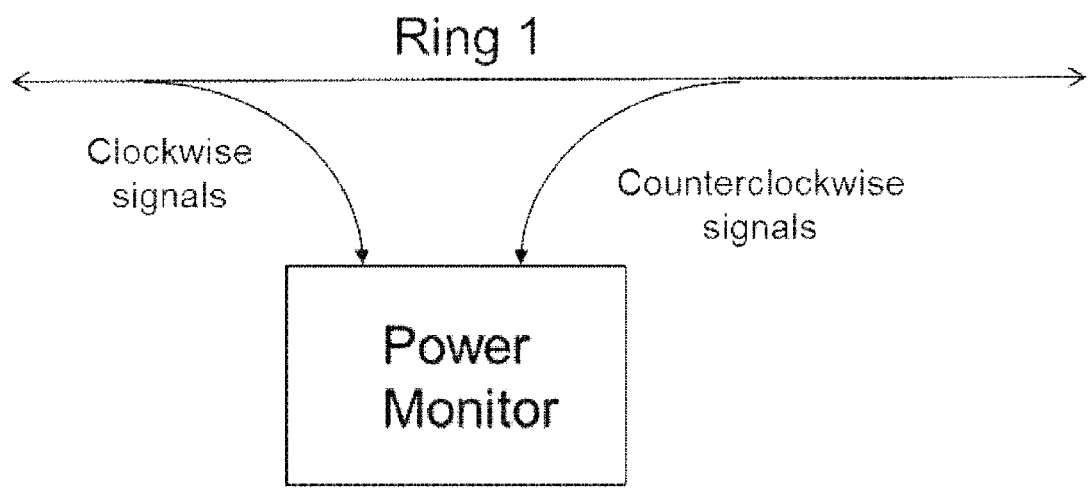
FIG. 7 shows a schematic view of an arrangement of an optical power monitor for use in embodiments.

FIG. 7 Arrangement of an Optical Power Monitor for Use in Embodiments,

Optical power monitors may be present as shown in FIG. 7 to detect the presence of signals, distinguish their directions (working or protection) and automatically configure the switch. The monitoring can be simply implemented by means of optical taps, as illustrated in FIG. 7. This shows taps in both directions of the bidirectional single fiber to enable fault detection in both directions. The optical monitor can be implemented in various ways using established techniques and equipment. The fault being detected may be loss of signal, or detection of loss of individual wavelengths, or optical noise level and so on.

Figure 8:
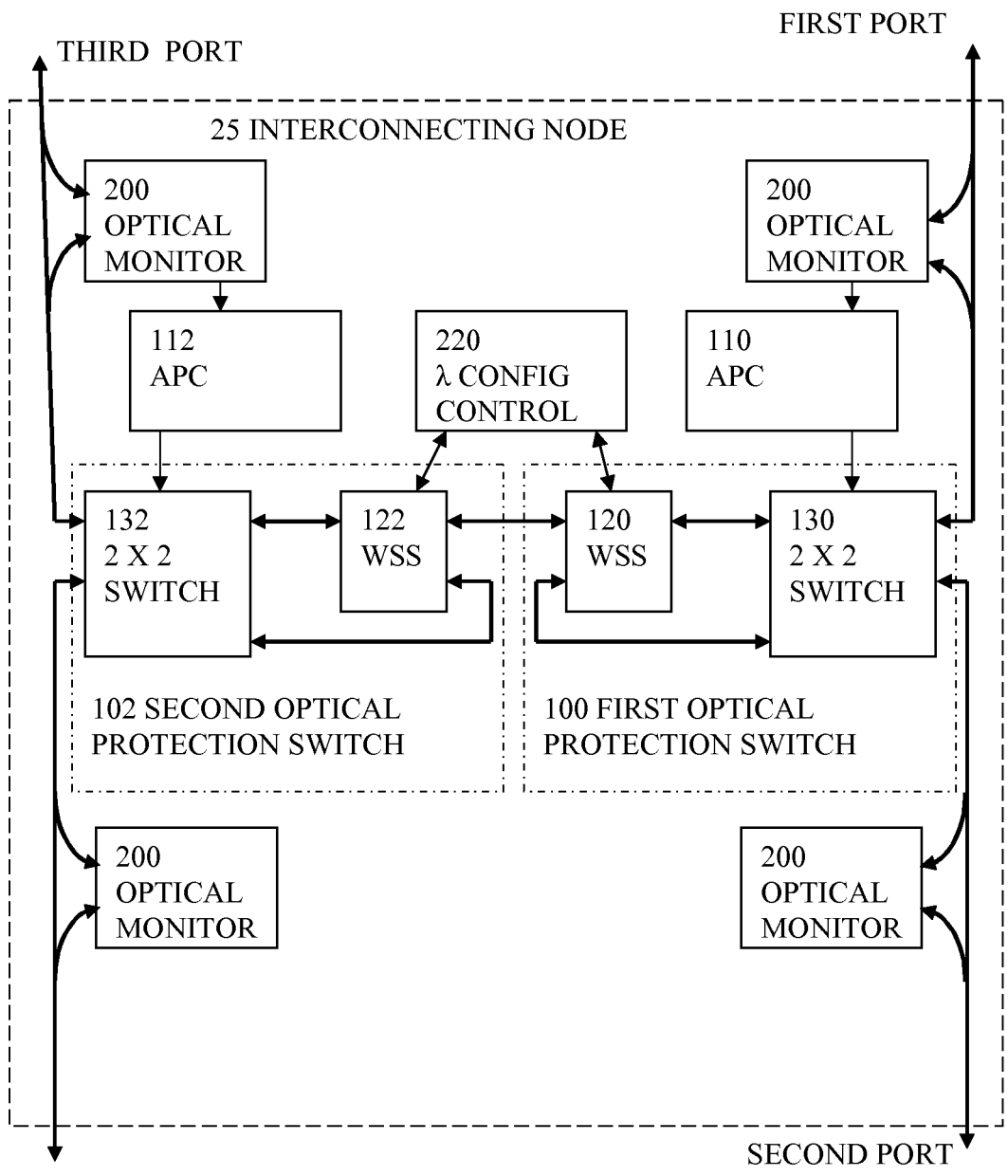
FIG. 8 shows a schematic view of an interconnecting node having optical protection switches and further optical monitors according to an embodiment.

FIG. 8 Interconnecting Node Having Optical Monitors

FIG. 8 shows an example of an interconnecting node 25 for use in the embodiment of FIG. 4 or in other embodiments. It has a first optical protection switch 100 coupled to a second optical protection switch 102. Each of these parts can be implemented as shown in FIG. 2 or 3 for example. In this case optical monitors are provided on all four ports, so that the working paths and protection paths of both rings are being monitored bidirectionally. The monitors may all be coupled to the APCs, so as to enable the switching to be controlled based on more information about the status of all the paths for example.

FIGS. 9-14 Paths Set Up for Three Different Situations

Figure 9:
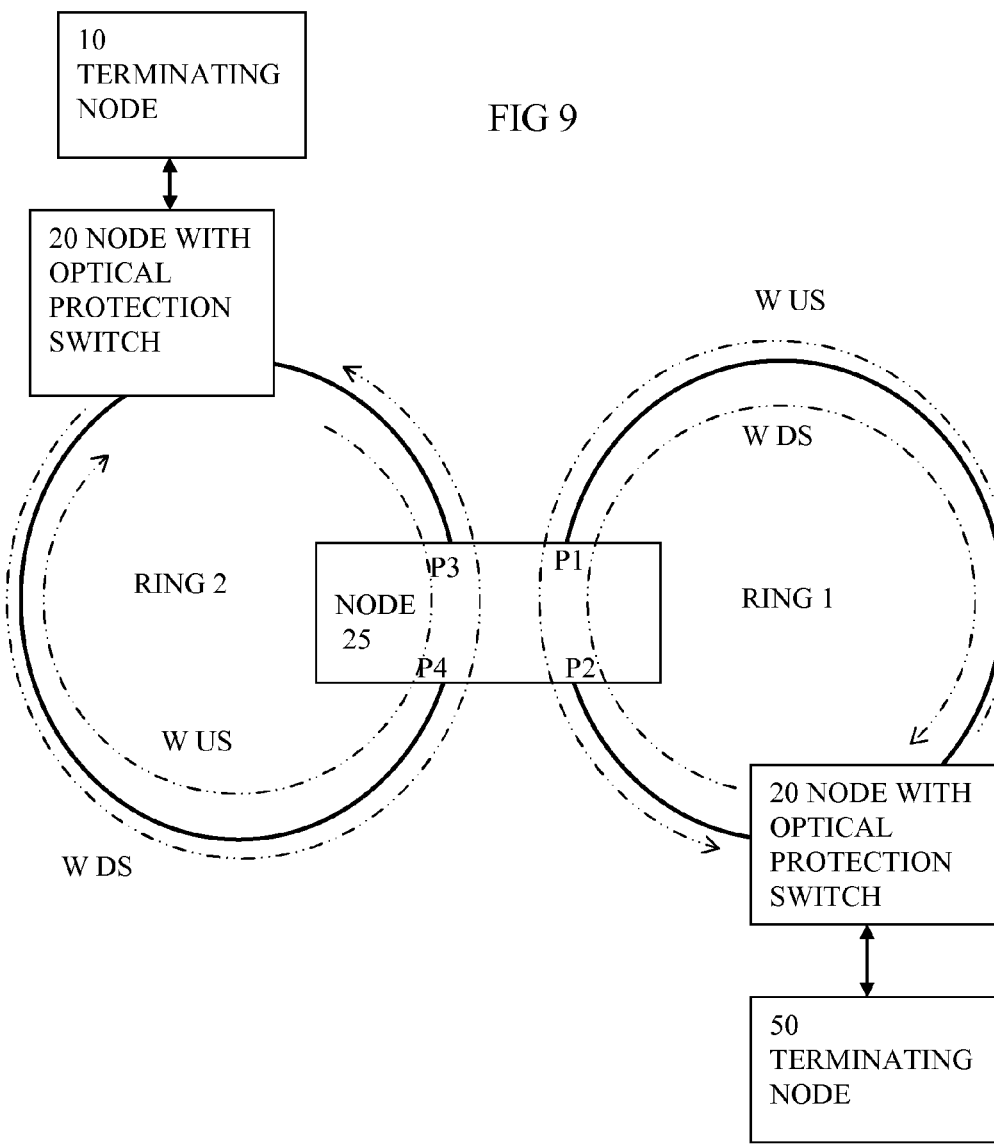
FIG. 9 shows a schematic view of two rings with an interconnecting node and showing paths through the interconnecting node according to an embodiment, for the case of pass through traffic only.
Figure 10:
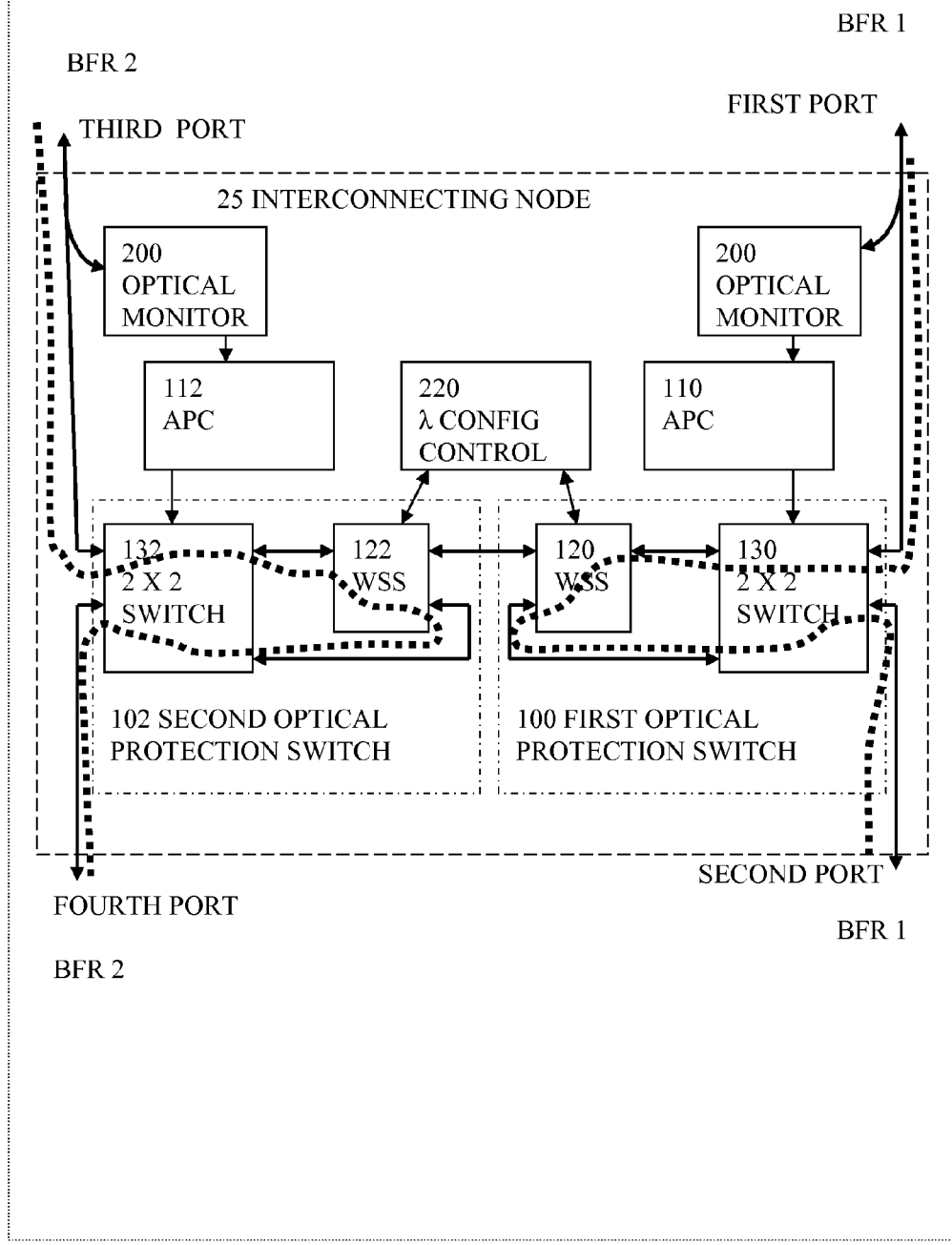
FIG. 10 shows a schematic view of an interconnecting node showing paths through it for the case of pass through traffic only.
Figure 11:
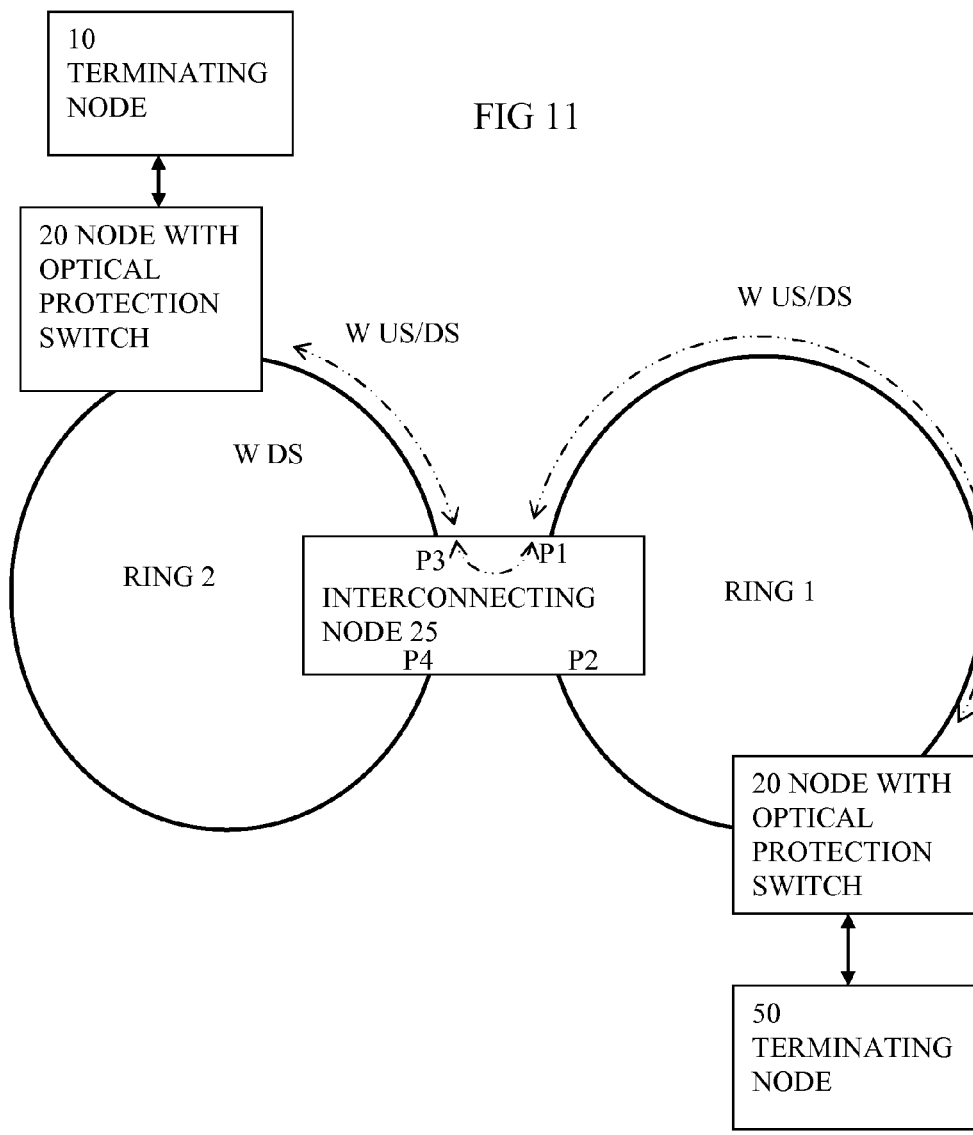
FIG. 11 shows a schematic view of two rings with an interconnecting node and showing paths through the interconnecting node according to an embodiment, for the case of a working path between the rings with no fault.
Figure 12:
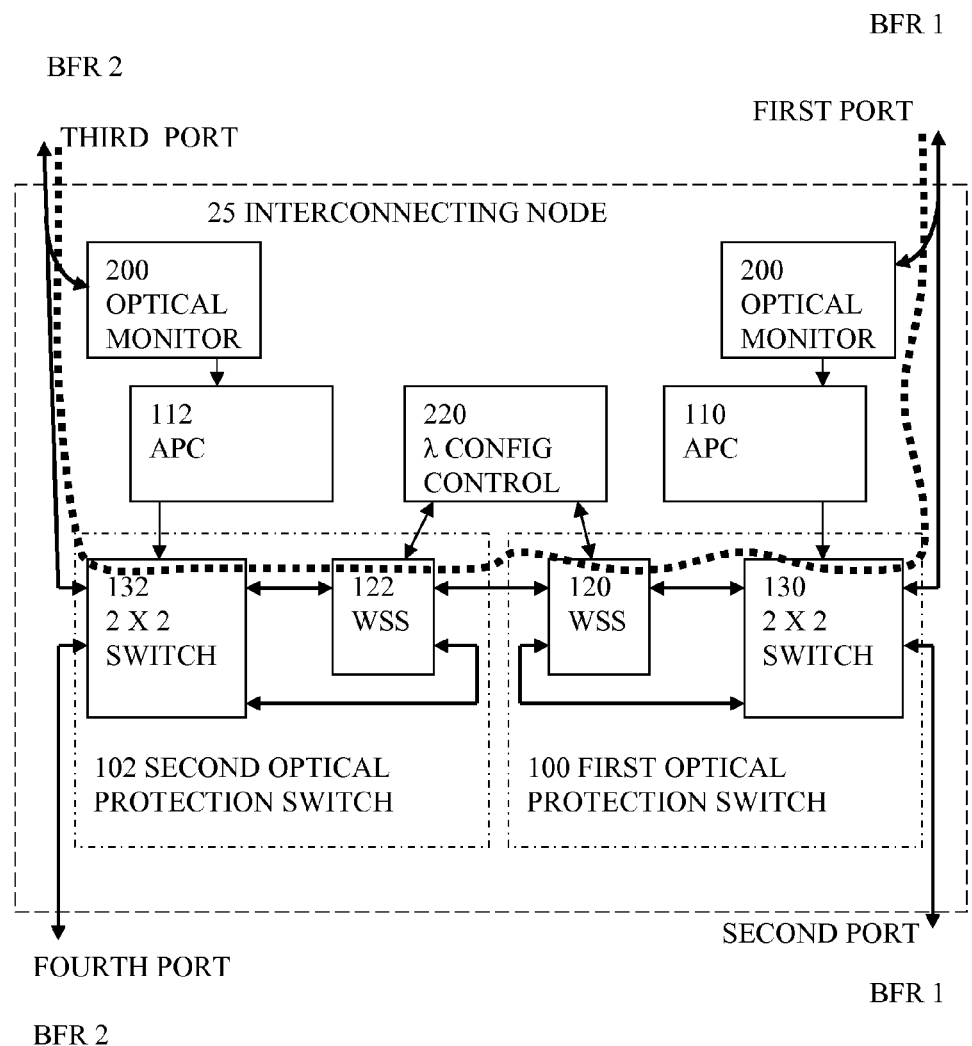
FIG. 12 shows a schematic view of an interconnecting node showing paths through it for the case of a working path between the rings with no fault.
Figure 13:
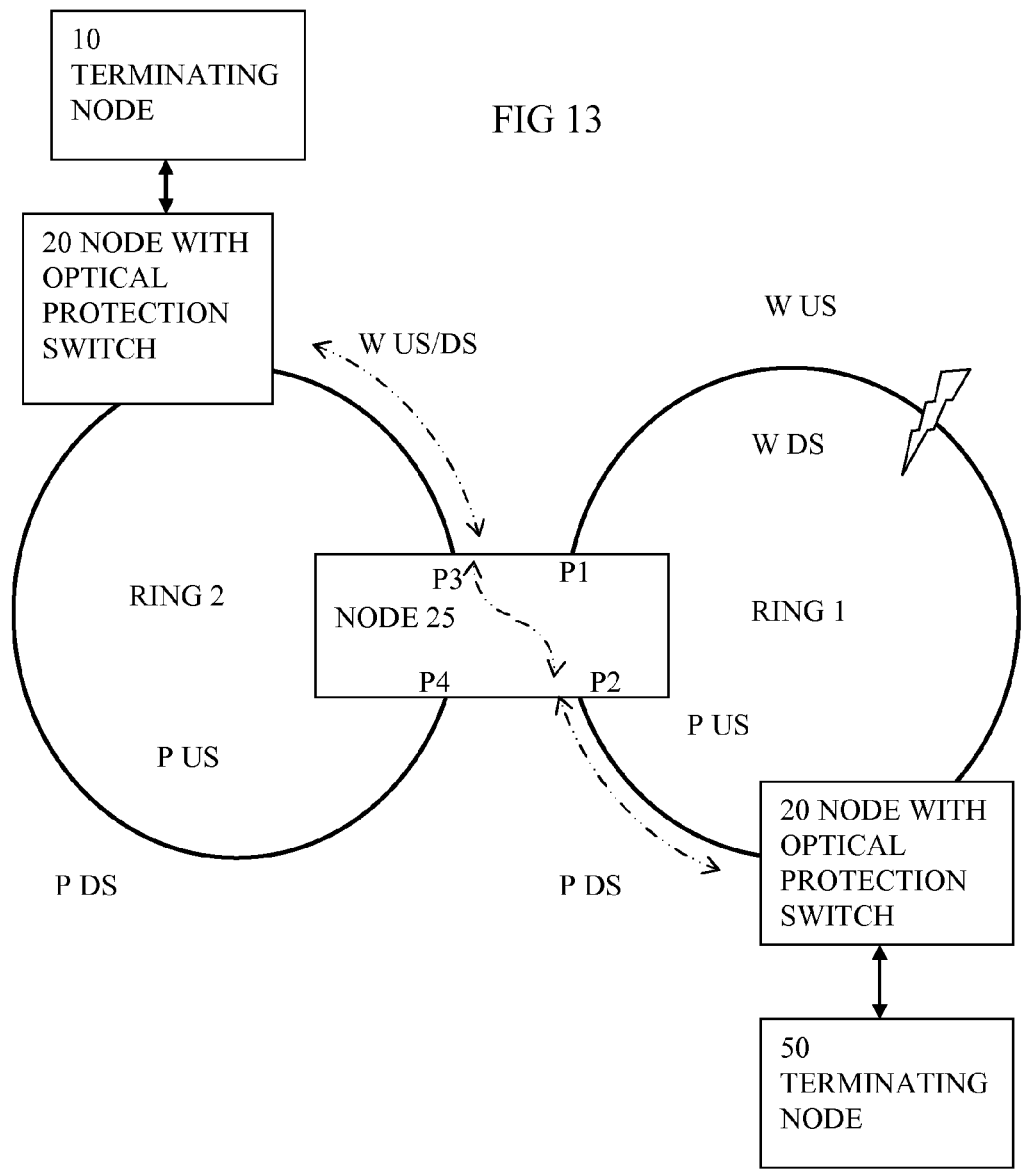
FIG. 13 shows a schematic view of two rings with an interconnecting node and showing paths through the interconnecting node according to an embodiment, for the case of a working path on one ring and a protection path on the other of the rings with a fault.
Figure 14:
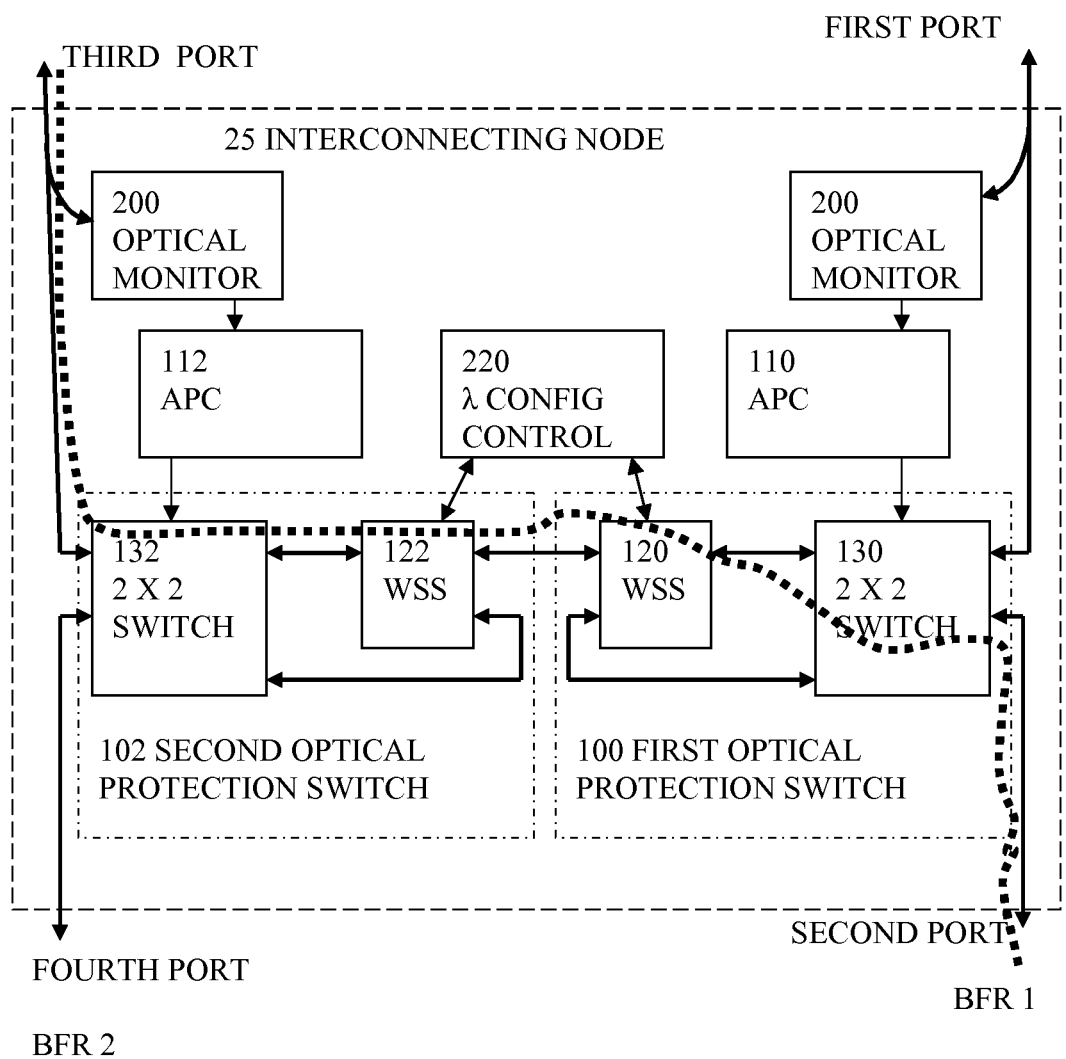
FIG. 14 shows a schematic view of an interconnecting node showing paths through it for the case of a working path on one ring and a protection path on the other of the rings with a fault.

FIGS. 9 to 14 are schematic views to show the paths set up for three different situations. In FIGS. 9 and 10, there are no wavelengths set up by the interconnecting node to pass between the two rings. In FIGS. 11 and 12, some wavelengths are selected and set up to pass between the two rings, and as there are no faults on either ring, the working paths are used. In FIGS. 13 and 14, some wavelengths are selected and set up to pass between the two rings, and as there is a fault on the first ring, the working paths are used for the second ring, but the protection paths are used for the first ring.

FIG. 9 shows a schematic view of two rings with an interconnecting node and showing paths through the interconnecting node according to an embodiment, for the case of pass through traffic only. It shows a network level view similar to that of FIG. 6, and shows how the interconnecting node 25 is configured to pass through wavelengths on each ring without coupling any wavelengths between the two rings. References to wavelengths typically means bidirectional upstream (US) and downstream (DS) wavelengths. In the interconnecting node Port P1 is coupled to P2 and port P3 is coupled to P4. FIG. 10 shows a schematic view of the interconnecting node 25 similar to the view of FIG. 5 and with a thick dotted line added to show the paths of wavelengths through the first and second optical protection switches. This shows that wavelengths going around the first ring pass from the first port of the first optical protection switch to a first side of the 2×2 switch, through to a second side of that switch which is coupled to a common port of the WSS. All wavelengths are routed by the WSS 120 onto a switched port which is coupled back to a different port of the second side of the 2×2 switch 130 and from there to the second port. In this case the 2×2 switch is set in a "parallel path" setting.

FIG. 11 shows a view similar to that of FIG. 9, but in this case there is an interconnecting path for at least some of the wavelengths to pass between the rings. For these wavelengths, P3 is connected to P1. For other wavelengths not shown, the interconnecting node may at the same time provide pass through connections to couple P1 to P2, and P3 to P4. FIG. 12 shows a view similar to that of FIG. 10 but for the case of providing an interconnecting path for at least some of the wavelengths to pass between the rings. A thick dotted line shows the paths of wavelengths through the first and second optical protection switches between the third port P3 and the first port P1. This shows that wavelengths on the first ring pass from the first port of the first optical protection switch to a first side of the 2×2 switch 130, through to a second side of that switch which is coupled to a common port of the WSS 120. These wavelengths are routed by the WSS 120 onto a switched port which is coupled to the external path to reach the second optical protection switch 102. Here they pass from a switched port of the WSS 122 to a common port of the WSS 122, which is coupled to a second side of 2×2 switch 132. This switch is set in a "parallel" setting and so these wavelengths pass from the first side of the switch to the third port which means they are coupled onto their working path on the second ring.

FIG. 13 shows a view similar to that of FIG. 11, but in this case as well as an interconnecting path for at least some of the wavelengths to pass between the rings, there is a fault on the working path of the first ring. This means the protection path is used on the first ring and the working path on the second ring. For these wavelengths, within the interconnecting node, P3 is connected to P2. For other wavelengths not shown, the interconnecting node may at the same time provide pass through connections to couple P1 to P2, and P3 to P4. FIG. 14 shows a view similar to that of FIG. 12 but for the case of a fault on the working path of the first ring. The thick dotted line shows the paths of wavelengths through the first and second optical protection switches between the third port P3 and the second port P2. Unlike FIG. 12, in FIG. 14, the 2×2 switch 130 is set in a "crossover" setting. This means the first optical protection switch 100 is configured to couple the external optical path with the second port, which is effectively the protection path for the first ring.

Figure 15:
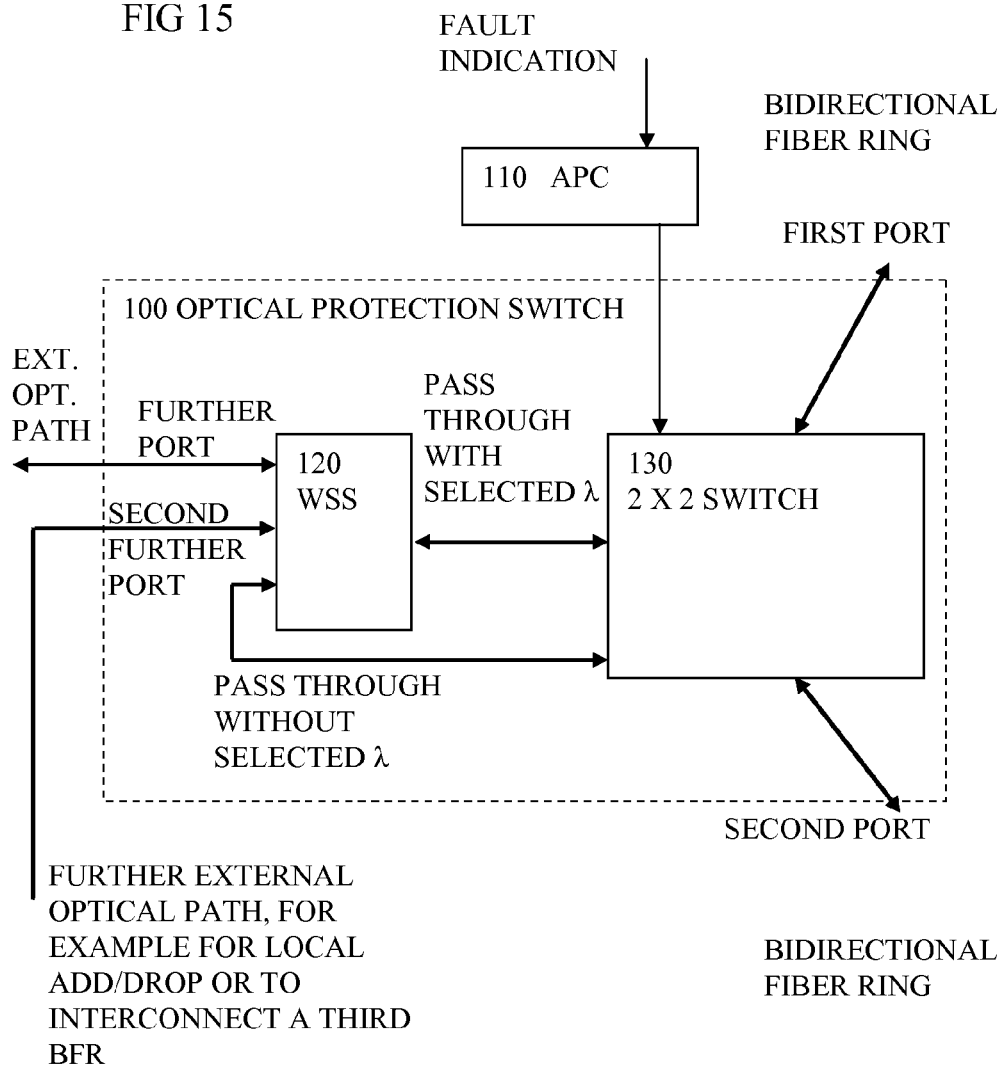
FIG. 15 shows a schematic view of a node having an optical protection switch according to an embodiment having a WSS and 2×2 optical switch and having a second further port.

FIG. 15, Node Having Second Further Port

FIG. 15 shows a schematic view of a node similar to that shown in FIG. 3 having an optical protection switch having a WSS and 2×2 optical switch and having a second further port on the WSS 120. This can be used to enable the WSS to couple wavelengths selectively from the ring with a local add/drop optical path, or to interconnect to a third bidirectional ring for example, as well as the second ring shown in FIGS. 9 to 14. This implies the use of a three way WSS rather than the two way WSS of the examples described above. This will add some cost and complexity. If applied to the interconnecting node 25 having two optical protection switches, then optionally each of these two optical protection switches can have second further ports as described.

Figure 16:
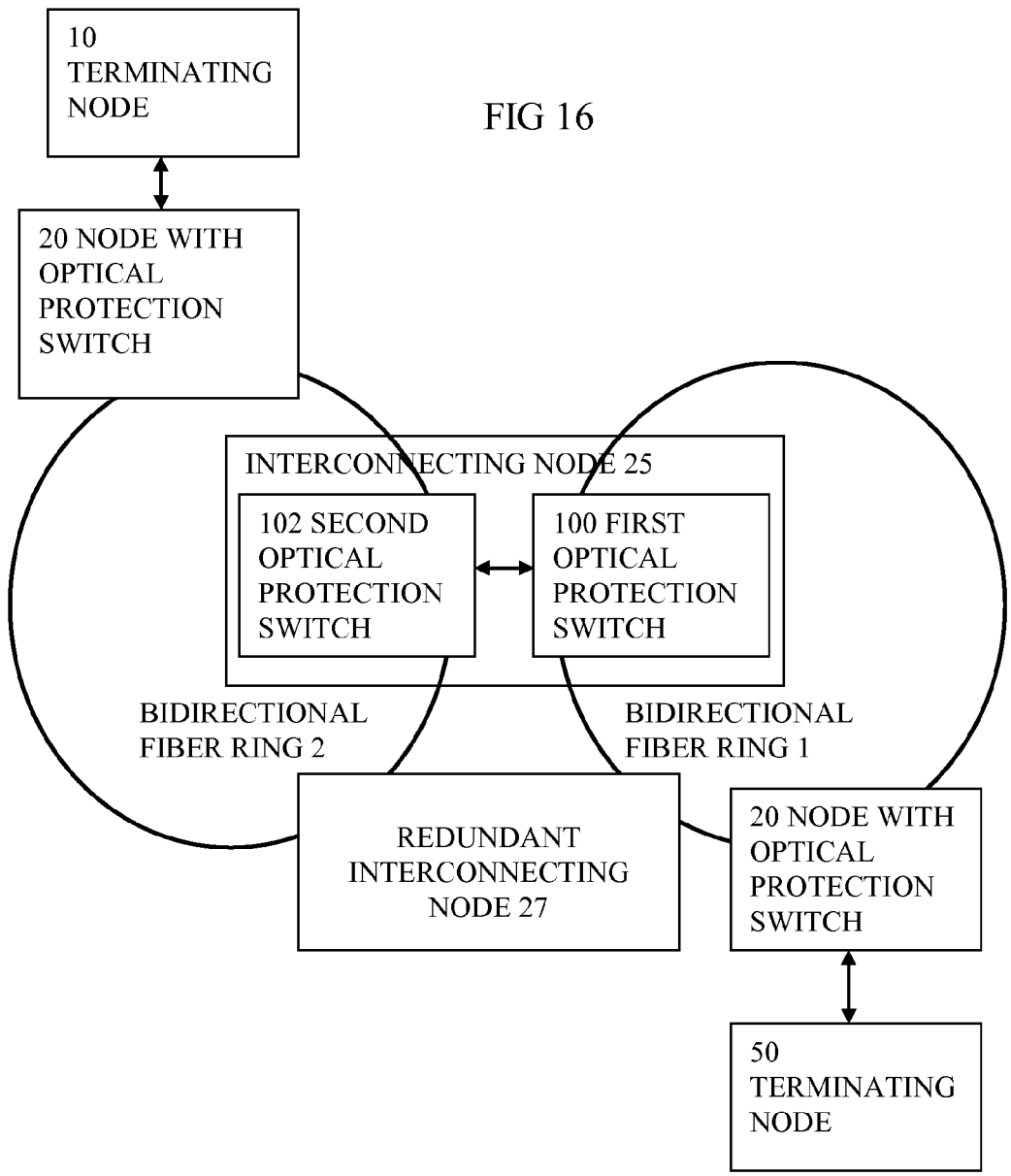
FIG. 16 shows a schematic view of two rings with an interconnecting node and showing paths through the interconnecting node according to an embodiment having a redundant interconnecting node.

FIG. 16 Two Rings with Interconnecting Node Redundant Interconnection Node

FIG. 16 shows a schematic view of two rings with an interconnecting node and showing paths through the interconnecting node according to an embodiment having a redundant interconnecting node 27. This can reduce the risk of failure of the interconnecting node being unrecoverable. In principle the interconnecting node can be similar to the interconnecting node 25, or other types of interconnecting node can be used which don't have the optical protection switches.

Figure 17:
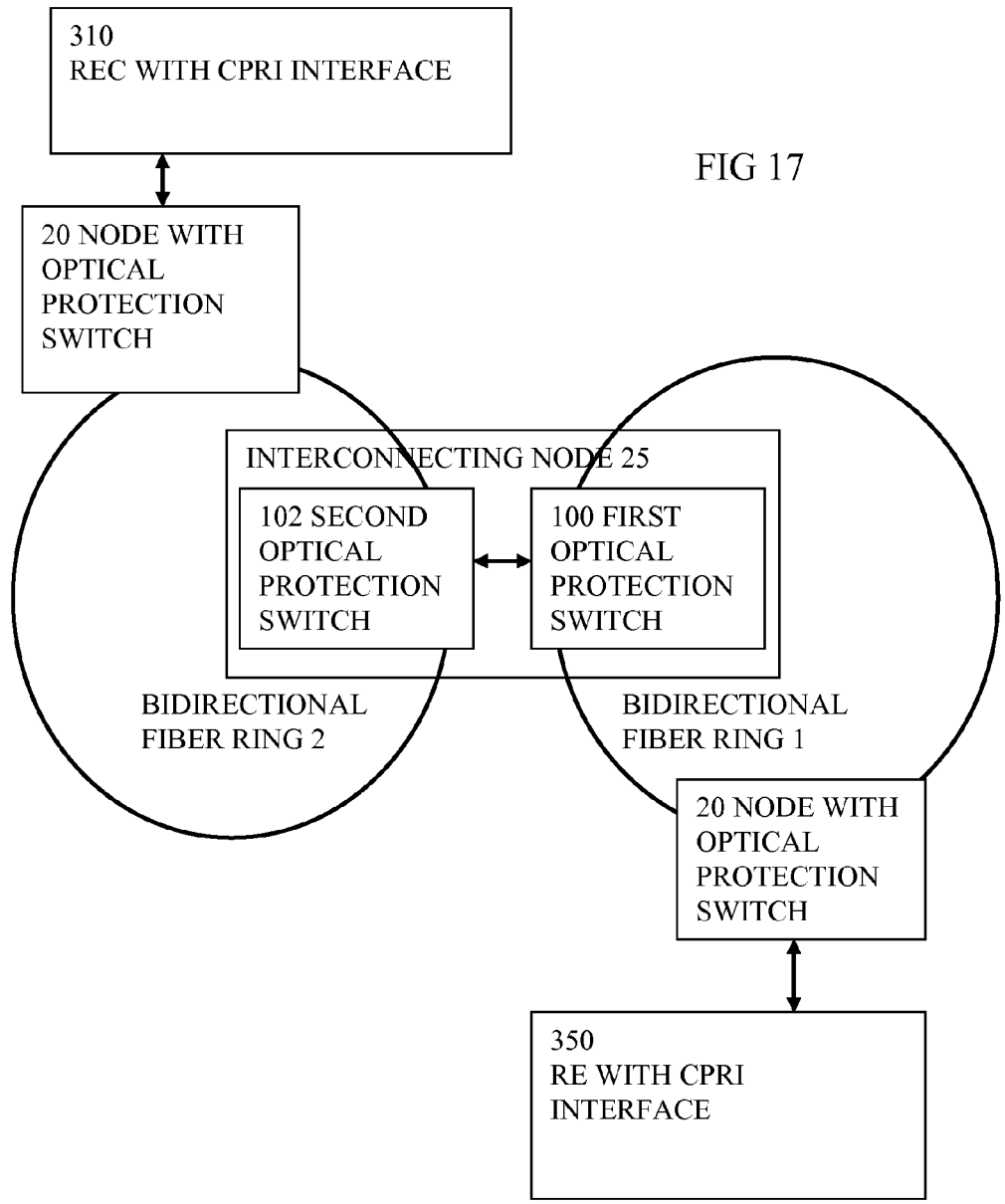
FIG. 17 shows a schematic view of two rings with an interconnecting node and showing paths through the interconnecting node according to an embodiment having a REC and RE for a CPRI interface.

FIG. 17, CPRI Example

FIG. 17 shows a schematic view of an embodiment similar to FIG. 4. It shows two rings with an interconnecting node 25 according to an embodiment having a CPRI interface. CPRI is a digitized and serial internal radio base station interface that establishes a connection between 'Radio Equipment Control' (REC) and 'Radio Equipment' (RE) enabling single-hop and multi-hop topologies. Three different information flows (User Plane data, Control and Management Plane data, and Synchronization Plane data) are multiplexed over the interface. The specification covers ISO layers 1 and 2. The physical layer (layer 1) supports both an electrical interface (as used in traditional radio base stations), and an optical interface (as used in distributed radio base stations with remote radio equipment). In FIG. 17, a REC 310 having a CPRI interface is coupled to a node 20 having an optical protection switch. The CPRI data can be transmitted or received over the two rings via the interconnecting node to an RE 350 with a CPRI interface. This can provide a relatively low cost way of meeting the needs of symmetry between upstream and downstream flows, with high bandwidth and low latency.

Some embodiments propose a four ports WDM node able to interconnect two fibre rings and ensuring link protection in case of fibre cut. Two additional ports, based on the embodiment of FIG. 15, may be present for locally added and dropped channels. Embodiments can realize a protected connection between two bidirectional WDM rings. In some cases this can be used in a RAN. For each wavelength, working and protection paths are complementary portions of the rings. For both working and protected wavelengths, US and DS signals travel, into opposite direction, along the same portion of the ring. Working downstream wavelengths can travel counterclockwise (or vice versa) in both the interconnected rings while protected downstream wavelengths travel clockwise (or vice versa) in both the interconnected rings. The same applies vice versa for upstream wavelengths. Working and protected wavelength paths can be provided between two add drop nodes, node A and node B, placed in interconnected Ring 1 and Ring 2 respectively.

Wavelengths that are added and dropped in Ring 1 and do not need to be transferred to Ring 2, pass through ports 1 and 2 of the interconnect node. Wavelengths that are added and dropped in Ring 2 and do not need to be transferred to Ring 1, pass through ports 3 and 4 of the interconnect node. A working path for wavelengths added in Ring 1 and dropped in Ring 2 (or vice versa), passes through ports 1 and 3 of the interconnect node. Protection wavelengths added in Ring 1 and dropped in Ring 2 (or vice versa), pass through ports 2 and 4 of the interconnect node. When a fault such as a fibre cut occurs on ring 1 or 2, the active wavelengths are dynamically switched from ports 1 and 2 to ports 3 and 4.

All the functionalities needed for the interconnect node described before can be realized with for example two low cost two-ways wavelength selective switches (WSS) which are used to connect the wavelengths in the same ring or cross connect wavelengths with the other ring. Two outer switches are used to cross-connect the WSS ports in case protection is needed. This configuration helps enable a low cost node since a simple two-way WSS can be used (for instance a WSS based on DLP technology). Moreover the bidirectional operation avoids equipment duplication.

Other variations can be envisaged within the claims.

The invention claimed is:

1. A node for a single fiber bidirectional WDM optical ring network, the node having:
    a first optical protection switch having first and second ports for coupling to respective first and second adjacent portions of the single fiber bidirectional ring, while providing a pass through optical path for wavelengths on the bidirectional ring to pass between the first and second adjacent portions,
    the first optical protection switch also having a further port for coupling to an external optical path, external to the bidirectional ring,
    the first optical protection switch having a control input for receiving an indication of fault in the bidirectional ring, and
    the optical protection switch being operable to selectively couple the further port to the first port and the second port according to the indication of a fault, so as to selectively provide a bidirectional working path between the further port and the first port and a bidirectional protection path between the further port and the second port, and so as to maintain the same optical path on the bidirectional ring for both directions of the bidirectional selected wavelengths.

2. The node of claim 1, the optical protection switch being configured to maintain the pass through optical path when coupling the bidirectional selected wavelengths between the external optical path and the second port.

3. The node of claim 1, the first optical protection switch comprising a 2×2 optical switch and a wavelength selective switch, the wavelength selective switch having a common port and at least two switched ports, the common port and one of the switched ports being coupled separately to a first side of the 2×2 optical switch, another side of the 2×2 optical switch being coupled separately to the first and second ports respectively, and another of the switched ports of the wavelength selective switch being coupled to the external optical path, the 2×2 optical switch having a working path state in which it is operable to couple the common port to the first port and to couple the one of the switched ports to the second port, and a protection path state in which it is operable to couple the common port to the second port and to couple the one of the switched ports to the first port.

4. The node of claim 1, further comprising a second optical protection switch, to couple the external optical path to a second single fiber bidirectional ring, the second optical switch comprising third and fourth ports for coupling with first and second adjacent portions of the second single fiber bidirectional ring, the second optical protection switch being operable to couple optically the bidirectional selected wavelengths selectively with either of the third and fourth ports, according to an indication of a fault in the second bidirectional ring, so as to use the first and second adjacent portions of the second bidirectional ring respectively as a working path and a protection path for the bidirectional selected wavelengths, and so as to maintain the same optical path on the second bidirectional ring for both directions of the bidirectional selected wavelengths.

5. The node of claim 1 having an optical monitor configured to monitor the bidirectional ring to detect a fault condition and to generate the fault indication.

6. The node of claim 1 the node also having an automatic protection controller configured to receive an indication of a fault in the bidirectional ring and being operable to control the first optical protection switch to use the working path or the protection path according to the indication of a fault.

7. The node of claim 1 the first optical protection switch having a second further port for coupling a subset of the bidirectional selected wavelengths with a second external optical path.

8. A communications network having a single fiber bidirectional ring and having at least two nodes, the nodes each having:
- a first optical protection switch having first and second ports for coupling to respective first and second adjacent portions of the single fiber bidirectional ring, while providing a pass through optical path for wavelengths on the bidirectional ring to pass between the first and second adjacent portions,
- the first optical protection switch also having a further port for coupling to an external optical path, external to the bidirectional ring,
- the first optical protection switch having a control input for receiving an indication of fault in the bidirectional ring, and
- the optical protection switch being operable to selectively couple the further port to the first port and the second port according to the indication of a fault, so as to selectively provide a bidirectional working path between the further port and the first port and a bidirectional protection path between the further port and the second port, and so as to maintain the same optical path on the bidirectional ring for both directions of the bidirectional selected wavelengths.

9. The communications network of claim 8, wherein in the at least two nodes the optical protection switch being configured to maintain the pass through optical path when coupling the bidirectional selected wavelengths between the external optical path and the second port.

10. The communications network of claim 8, having a second single fiber bidirectional ring, interconnected by a node as one of the at least two nodes wherein the interconnecting node further comprises a second optical protection switch, to couple the external optical path to a second single fiber bidirectional ring, the second optical switch comprising third and fourth ports for coupling with first and second adjacent portions of the second single fiber bidirectional ring, the second optical protection switch being operable to couple optically the bidirectional selected wavelengths selectively with either of the third and fourth ports, according to an indication of a fault in the second bidirectional ring, so as to use the first and second adjacent portions of the second bidirectional ring respectively as a working path and a protection path for the bidirectional selected wavelengths, and so as to maintain the same optical path on the second bidirectional ring for both directions of the bidirectional selected wavelengths.

11. The communications network of claim 10 having a second interconnecting node to provide a redundant interconnection between the two single fiber bidirectional rings.

12. A method of protection switching at a node of a single fiber bidirectional WDM optical ring network, the node having:
- a first optical protection switch having first and second ports for coupling to respective first and second adjacent portions of the single fiber bidirectional ring, while providing a pass through optical path for wavelengths on the bidirectional ring to pass between the first and second adjacent portions,
- the first optical protection switch also having a further port for coupling to an external optical path, external to the bidirectional ring, the method having the steps of:
- when no fault is indicated, sending communications traffic using bidirectional selected wavelengths via the first optical protection switch, configured to couple optically the bidirectional selected wavelengths between the further port and the first port, to use the first adjacent portion of the bidirectional ring as a working path for the bidirectional selected wavelengths, and
- when an indication of a fault in the bidirectional ring is received, sending communications traffic using the bidirectional selected wavelengths via the first optical protection switch between the further port and the second port, to use the second adjacent portion of the bidirectional ring as a protection path for the bidirectional selected wavelengths so as to maintain the same optical path on the bidirectional ring for both directions of the bidirectional selected wavelengths.

13. The method of claim 12, the node further comprising a second optical protection switch, coupled to the external optical path, and coupled to a second single fiber bidirectional ring, the second optical switch comprising third and fourth ports for coupling with adjacent portions of the second single fiber bidirectional ring, the method also having the steps of:
- when no fault is indicated in the second bidirectional ring, sending communications traffic using the bidirectional selected wavelengths via the second bidirectional ring and via the second optical protection switch, configured to couple optically the selected at least one wavelength between the external optical path and the third port, to use a first adjacent portion of the bidirectional ring as a working path for the bidirectional selected wavelengths, and
- when an indication of a fault in the second bidirectional ring is received, sending the communications traffic using the bidirectional selected at least one wavelength via the second optical protection switch, configured to couple optically the selected at least one wavelength between the external optical path and the fourth port, to use a second adjacent portion of the second bidirectional ring as a protection path for the selected at least one wavelength so as to maintain the same optical path on the bidirectional ring for both directions of the bidirectional selected wavelengths.

14. The method of claim 13, the at least one selected wavelengths comprising bidirectional wavelengths, the first optical protection switch being configured to use the same optical path for both directions of the bidirectional wavelengths, and the communications traffic comprising upstream and downstream CPRI frames.

* * * * *